Aug. 9, 1949.     J. A. TALALAY     2,478,340
APPAREL PAD AND METHOD OF MAKING THE SAME
Filed June 17, 1946                    2 Sheets-Sheet 1

Joseph Anton Talalay
                Inventor
By Willard D. Eakin
        Attorney Aug. 9, 1949.   J. A. TALALAY   2,478,340
APPAREL PAD AND METHOD OF MAKING THE SAME
Filed June 17, 1946   2 Sheets-Sheet 2

Joseph Anton Talalay
Inventor
By Willard D. Eakin
Attorney

Patented Aug. 9, 1949

2,478,340

UNITED STATES PATENT OFFICE 2,478,340

APPAREL PAD AND METHOD OF MAKING THE SAME

Joseph Anton Talalay, Hamden, Conn., assignor to Walter Riedler and Berthold Mechur, copartners doing business as Invisible Fastener Company, New York, N. Y.

Application June 17, 1946, Serial No. 677,238

19 Claims. (Cl. 2—267)

This invention relates to apparel pads formed of reticulated, reinforced fibrous materials, suitable for use as shoulder pads, for example, in the clothing or garment trade, and to procedure for making the same.

Ordinary molding techniques are not applicable to fibrous materials in open-mesh or reticulated form comprising a binder, such as rubber or the like, which anchors at least some of the filaments to each other at their crossing points, such, for example, as are produced in accordance with U. S. Patent Number 1,906,028 or 2,140,063. Nor are the ordinary molding techniques suitable for the production of molded or shaped articles from fiber-reinforced sponge-like materials produced by causing a foam of a dispersion of rubber or the like to extend itself into the interstices of an open-mesh body of fibrous material. Materials of this kind exhibit no flow-characteristics at any practical range of pressure and temperature.

In addition, bonded open-mesh fibrous materials are, by their very nature, most economically produced in the form of comparatively thin and preferably continuous sheets.

My chief object is to provide a new and advantageous method of producing shaped or molded articles or objects, with essentially uniform or with predetermined non-uniform density distribution, from bonded, open-mesh, fibrous, materials.

In one of the preferred procedures for the practice of my invention, viz., in the manufacture of a molded shoulder pad for the garment trade, I take a quantity of virgin or re-processed wool or the like. It is picked on a standard textile picker, and then carded on the usual type of textile carding machine, to produce a thin and open-mesh web. The web is then sprayed with rubber latex or the like first from one side and dried and then from the other side and dried again. Next the web is caused to pass through a dilute latex bath, the surplus of liquid is permitted to drain off or is blown off with compressed air and the web is again dried. The latex employed may contain the necessary compounding ingredients to cause its vulcanization in a subsequent operation of heat treatment, to insure good aging properties, to give it the necessary colloidal stability and, if desired, a distinctive coloring. The wool may have been treated with a suitable cationic or anionic agent to facilitate adhesion of the rubber film.

From the web so obtained are now cut or clicked a multiplicity of parts of similar general character but of graduated sizes, which represent, but in flat form, successive layers of the scoop-shaped final pad. These parts are piled up in the desired configuration so as to most closely conform to, or to be somewhat in excess of, the ultimate size and shape of the article, and are mutually adhered with a dispersion or solution of a flexible adhesive. The blank so pre-assembled is placed in a mold where it is subjected to compression of a magnitude sufficient to consolidate the plies but insufficient to obliterate the open-mesh character of the structure, and is also subjected to heat in order to permanently set the laminated article, in its ultimate form.

The success of my method requires only a certain amount of compressibility on the part of the individual layers from which the blank is built up, and does not require ability of the material to "flow" or to exhibit mobility.

The resultant article has a permanent shape and exhibits a high degree of uniformity as far as its density is concerned. It appears smooth on the surface in spite of the fact that it was built up from a number of laminations. If desired, one or more surfaces of the article can be covered with woven or felted fabrics in the same or in a separate process. The covering fabric may be especially treated to act as a barrier for liquids or gases, such as steam used in pressing, fluid used in dry cleaning, or perspiration.

The vulcanization of the rubberized web can be part of the same process as the molding. On the other hand, the web can be partially or fully vulcanized in its original form, and the deformative molding can be effected by using an atmosphere of heat and humidity, e. g. by steaming.

In another preferred method of my invention the web can be cut or diced into randomly irregular pieces of say 0.25 to 0.50 inch linear dimensions. These chips or pieces can be placed in a tumbling barrel and a small amount of a homogeneous or foamed adhesive can be added. The surfaces of the chips thus become coated with the adhesive. A desired quantity of the coated chips is transferred into a mold where the adhesive is permitted to set, e. g. by drying, and to consolidate the chips to a unit whole of the shape comforming to the cavity of the mold. When using this second preferred method it is desirable though not necessary to use a slight volumetric excess of chips, e. g. to fill the mold heaping full, so as to cause the chips to press against and become adhered to one another so that the molded product will be a unified, coherent, form-retaining structure. An interesting result of this second method is the fact that the fibres assume in the finished product a random arrangement, while in the web they are, by virtue of the carding process, preferentially oriented in one or two directions.

A representative example of methods and contrivances for carrying out the invention is illustrated, more or less diagrammatically, on the accompanying drawings, in which.

Referring more particularly to Figs. 1, 2 and 3 to 8, *a*, *b*, *c*, *d*, *e*, and *f* are die-cut parts made from reticulated, open-mesh bonded fibrous material of uniform and slight thickness, e. g. one quarter of an inch gauge, and forming the laminations of successively decreasing size from which the molded shoulder pad is built up. *g* is a layer of woven or felted fabric attached to the outer surface of the pad and overhanging same at the edges.

Figure 1:
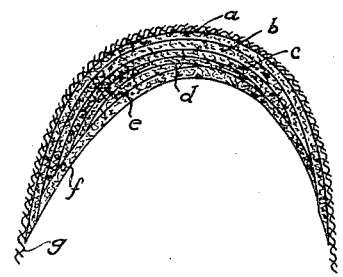
Figure 1 is a cross sectional view of a shoulder pad used in the garment trade.
Figure 2:
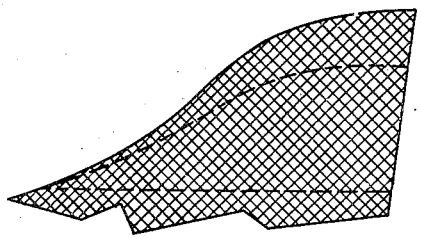
Figure 2 is a side elevation thereof.
Figure 3:
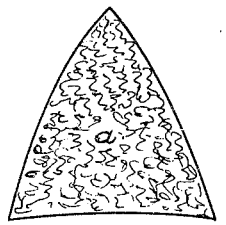
Figs. 3 to 8 are face views of blanks of stock in sheet form as they appear before they are built into the finished pad shown in Figs. 1 and 2.
Figure 4:
Figure 5:
Figure 6:
Figure 7:
Figure 8:
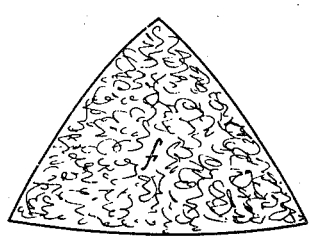
Figure 9:
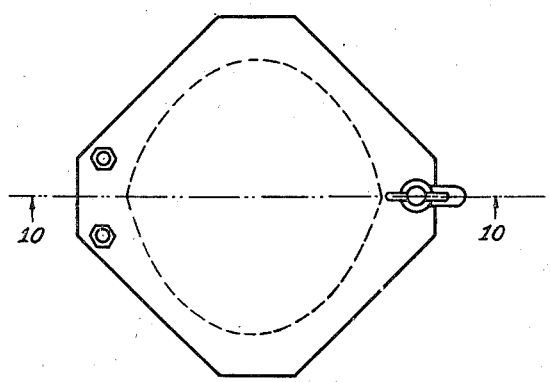
Fig. 9 is a top view of a mold adapted for the practice of my invention.
Figure 10:
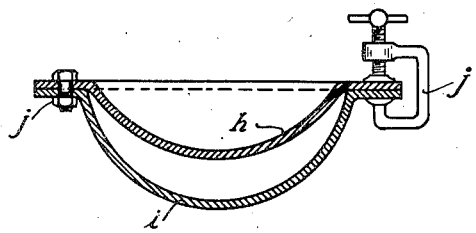
Fig. 10 is a cross-section of the same.
Figure 11:
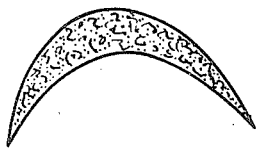
Figure 11 shows a cross-sectional view of a shoulder pad made of chips of reinforced fibrous material in random arrangement according to the second above described method.

Referring more particularly to Figs. 9 and 10, *h* and *i* are two dished members made of perforated metal and corresponding to the inner and to the outer contours of the shoulder pad respectively. *j* are clamping devices to hold the two members of the mold together.

My invention is not wholly limited to the above described examples. While the use of a fibre having the pertinent characteristics of wool is a preferred procedure, other fibres like cotton, hair, vegetable fibres of the textile variety, Spanish moss, palmleaf, or coconut fibre, etc. or artificial fibres like viscose or acetate rayon or nylon, especially when endowed with a natural, mechanical or chemical crimp, can be used. The invention is not limited to animal or vegetable or synthetic fibres since metallic wire of fine gauge, and, if needed, suitably curled or crimped, can be used. A great variety of binders is available for the execution of this invention and their choice may be affected by the ultimate conditions of use to which the article is to be submitted. As an example it may be mentioned that a shoulder pad for the garment trade should preferably be able to withstand dry cleaning and steam pressing. A binder of the oil-resistant synthetic rubber variety like neoprene, Perbunan, or their mixtures with polyvinyl chloride latex may be desirable. A high degree of resistance to solvents is exhibited by plasticized and hardened gelatinous binders.

In the case of the stacked sheets of graduated sizes, the consolidation of the laminations comprising the finished article may be effected over their entire area of contact or alternatively in selected areas or places. The laminations may, as an example, be merely joined at the apex by adhering them to one another on a narrow region extending itself across the pad. Alternatively a sewing technique may be employed, consolidating the layers in a few selected spots, before or after shaping the stacked set of blanks. Finally, both adhesion and sewing may be combined.

Since a "grain," i. e. a preferential direction, is often encountered in materials produced by the carding operation, some or all of the individual laminations may be arranged with their grains crossed.

In the appended claims the words "kink characteristics of wool" refer to the fact that wool has a natural three-dimensional kink, by reason of which it has softness and resilience as to compression in all of the three dimensions.

I claim:

1. A shoulder pad, comprising a number of deformed resilient elements assembled in resiliently fixed positioned relationship to define a predetermined outline of the pad, one at least of said elements contacting several of the remaining ones and being directly bonded thereto, substantially both along the plane of symmetry of the pad and in a direction perpendicular to said plane of symmetry, to maintain all of the elements in said resiliently fixed positioned relationship, said elements being made of a resilient material having the property of developing a permanent bond between contacting surfaces thereof when subjected to pressure and heat.

2. A shoulder pad, comprising a number of deformed resilient elements assembled in resiliently fixed positioned relationship to define a predetermined outline of the pad, one at least of said elements being in peripheral contact with several of the remaining ones, and being directly bonded thereto to maintain all of the elements in said resiliently fixed positioned relationship, said elements being made of a resilient material having the property of developing a permanent bond between contacting surfaces thereof when subjected to pressure and heat.

3. A shoulder pad, comprising a number of elements assembled in resiliently fixed positioned relationship, certain of said elements being similar in shape and of progressively decreasing sizes with respect to one another, corresponding convex portions of the peripheries of said certain elements being formed to define together the shape of the upper surface of the pad, one other at least of said elements contacting several of the remaining ones and being directly bonded thereto to maintain all of the elements in said resiliently fixed positioned relationship to define a predetermined outline of the pad, said elements being made of a resilient material having the property of developing a permanent bond between contacting surfaces thereof when subjected to pressure and heat.

4. A method for making a shoulder pad, comprising the steps of cutting sheets of a resilient material which has the property of developing a permanent bond between contacting surfaces thereof when subjected to pressure and heat, to form a number of elements, superimposing said elements in a predetermined positioned relationship, deforming the same to a predetermined shape, and subjecting the same to the action of heat while in said deformed condition, to cause the elements to become permanently bonded together.

5. A shoulder pad, comprising a number of resilient elements deformed and assembled to define together a predetermined configuration of the pad, one at least of said elements contacting several of the remaining ones and being directly bonded thereto, said elements being made of a resilient material having the property of developing a permanent bond between contacting surfaces thereof subjected to pressure and heat, whereby the elements are maintained in their deformed and assembled relationship and resiliently return thereto when displaced therefrom.

6. A shoulder pad, comprising a number of elements deformed and assembled together to define a predetermined configuration of the pad being limited by an uppermost convex surface and a lowermost concave surface, one at least of said elements contacting several of the remaining ones and being directly bonded thereto, said elements being made of a resilient material having the property of developing a permanent bond between contacting surfaces thereof when subjected to pressure and heat, whereby the elements are maintained in their deformed and assembled relationship and resiliently return thereto when displaced therefrom.

7. A shoulder pad, comprising a number of deformed resilient elements assembled in resiliently fixed positioned relationship to define a predetermined outline of the pad, one at least of said resilient elements contacting several of the remaining ones and being directly bonded thereto to maintain all the resilient elements in said resiliently fixed positioned relationship, said resilient elements being made of a material having the property of developing a permanent bond between contacting surfaces thereof when subjected to pressure and heat, and another resilient element similar in contour to the aforesaid one of said resilient elements, said two resilient elements being bonded substantially at least for the greater portion of their peripheries thereby to define an enclosure for the remaining resilient elements.

8. The method of making an apparel pad which comprises applying an elastomer in liquid form to coat and bind to one another at their crossing points the fibres of an open-mesh, unwoven web of fibrous material, allowing the resulting sheet-like structure to become partially set while in open-mesh form in all of the three dimensions, cutting a multiplicity of parts of different sizes from such sheetlike structure, so assembling said parts that in their entirety they approximate the ultimate desired shape of the apparel pad, and setting such multiplicity of parts in concavo-convex shape in a mold while maintaining them as an open-mesh structure.

9. The method of making an apparel pad which comprises applying a liquid dispersion of a substance having substantially the resilient deformability of soft-rubber to coat and bind to one another at their crossing points the fibres of an open-mesh, unwoven web of fibrous material having substantially the fibre size and kink characteristics of wool, allowing the resulting sheet to become partially set while in open mesh form in all of the three dimensions, cutting a multiplicity of parts of different sizes from such sheet-like structure, so assembling said parts that in their entirety they approximate, although in a distended form, the ultimate desired shape of the apparel pad, and setting such multiplicity of parts in concavo-convex shape in a mold by bringing them into intimate contact while maintaining them as an open-mesh structure.

10. The method of making an apparel pad which comprises bonding to one another at their crossing positions, with an elastic bonding substance, the fibres of an open-mesh, unwoven web of fibrous material, permitting a foam comprising a substance having substantially the resilient deformability of soft-rubber to extend itself through the interstices thereof, allowing the resultant structure to become partially set while in reticulated form in all three dimensions, cutting a multiplicity of parts of different sizes from such structure, so assembling said parts that in their entirety they approximate the ultimate desired shape of the apparel pad, and consolidating and setting such multiplicity of parts in concavo-convex shape in a mold by bringing them into intimate contact while maintaining them as a reticulated structure.

11. An apparel pad comprising a multiplicity of laminations of fibrous material in open-mesh web form and having substantially the fiber size and kink characteristic of wool, the fibres being individually coated and adhered to one another at their crossing points by a substance having substantially the resilient deformability of soft-rubber, the laminations being of different sizes and contours by reason of which the apparel pad is of concavo-convex shape, the laminations being secured to one another at least at selective points, and the structure being of open-mesh form in all of the three dimensions.

12. An apparel pad of concavo-convex shape, having its thickness graduated from a relatively thick portion to a thin marginal portion and comprising a stereoreticulate mass of fibers having substantially the fiber size and kink characteristics of wool, the fibers being individually coated and bonded to one another at their crossing positions by a substance which has substantially the resilient deformability of soft-rubber and of itself constitutes a three-dimensional, open-mesh net-work.

13. An apparel pad of concavo-convex shape, having its thickness graduated from a relatively thick portion to a thin marginal portion and comprising a stereoreticulate mass of fibers having substantially the fiber size and kink characteristics of wool, the fibers being individually coated and bonded to one another at their crossing positions by an oil-resistant synthetic rubber which of itself constitutes a three-dimensional, open-mesh net-work.

14. An apparel pad of concavo-convex shape, having its thickness graduated from a relatively thick portion to a thin marginal portion and comprising a stereoreticulate mass of fibers having substantially the fiber size and kink characteristics of wool, the fibers being individually coated and bonded to one another at their crossing positions by neoprene, the neoprene constituting a three-dimensional net-work.

15. The method of making an apparel pad of concavo-convex shape, having its thickness graduated from a relatively thick portion to a thin marginal portion which comprises plying up and adhering to one another a multiplicity of three-dimensional-network sheets of elastomer-bonded fiber having substantially the fiber size and kink characteristics of wool and shaping the plied-up structure to give it the said graduated thickness, the method including the step of so cutting the sheets that they are of graduated sizes.

16. The method of making an apparel pad of concavo-convex shape, having its thickness graduated from a relatively thick portion to a thin marginal portion which comprises plying up and adhering to one another a multiplicity of three-dimensional-network sheets of neoprene-bonded fiber having substantially the fiber size and kink characteristics of wool and shaping the plied-up structure to give it the said graduated thickness, the method including the step of so cutting the sheets that they are of graduated sizes.

17. The method of making an apparel pad which comprises assembling a plurality of substantially flat stereoreticulate sheets of fibrous material, each being of substantially uniform thickness throughout its extent, in association with an oil-resistant, heat-plastic, synthetic rubber, and molding the assembly as a unit from substantially flat shape to pronouncedly concavo-convex, thin-margin shape, the method including the step of cutting the sheets to different sizes appropriate to the positions they occupy in the finished thin-margin pad.

18. An apparel pad comprising a multiplicity of laminations of fibrous material in association with an oil-resistant, heat plastic, synthetic rubber, the laminations being molded as a unit to concavo-convex, thin-margin shape, in which they are held by the bonding substance, laminations of the pad being of different extensiveness appropriate to the positions they occupy in the finished thin-margin pad, and being of open-mesh form in all of the three dimensions.

19. An apparel pad of concavo-convex shape having its thickness graduated from a relatively thick portion to a thin marginal portion and comprising a set of parts attached to one another, each of said parts comprising a stereoreticulate mass of unwoven fibers coated and bonded to one another at their crossing positions by a bonding substance having substantially the resilient deformability of soft rubber, the fibers having substantially the fiber size and kink characteristics of wool.

JOSEPH ANTON TALALAŸ.

REFERENCES CITED

The following references are of record in the file of this patent:

UNITED STATES PATENTS

| Number | Name | Date |
| --- | --- | --- |
| 873,999 | Goldman | Dec. 17, 1907 |
| 1,606,307 | Loomis | Nov. 9, 1926 |
| 2,108,205 | Martin | Feb. 15, 1938 |
| 2,172,499 | Chassaing | Sept. 12, 1939 |
| 2,424,482 | Mechur | July 22, 1947 |
| 2,455,534 | Talalaÿ | Dec. 7, 1948 |

FOREIGN PATENTS

| Number | Country | Date |
| --- | --- | --- |
| 542,687 | Great Britain | Jan. 23, 1942 |